US010612573B2

(12) United States Patent
Recker et al.

(10) Patent No.: US 10,612,573 B2
(45) Date of Patent: Apr. 7, 2020

(54) BRACING CLAMP FOR BEAMS

(71) Applicant: MEADOW BURKE, LLC, Tampa, FL (US)

(72) Inventors: Michael J. Recker, Palmetto, FL (US); Ronald G. Naumann, Valrico, FL (US); Nathan Kurek, Dover, FL (US)

(73) Assignee: MEADOW BURKE, LLC, Tampa, FL (US)

( * ) Notice: Subject to any disclaimer, the term of this patent is extended or adjusted under 35 U.S.C. 154(b) by 0 days.

(21) Appl. No.: 16/056,189

(22) Filed: Aug. 6, 2018

(65) Prior Publication Data
US 2019/0048906 A1   Feb. 14, 2019

Related U.S. Application Data

(60) Provisional application No. 62/543,183, filed on Aug. 9, 2017.

(51) Int. Cl.
*F16B 2/06* (2006.01)
*F16B 2/12* (2006.01)
*F16L 3/24* (2006.01)
*E04G 5/04* (2006.01)

(52) U.S. Cl.
CPC ............... *F16B 2/065* (2013.01); *F16B 2/12* (2013.01); *F16L 3/24* (2013.01); *E04G 5/045* (2013.01)

(58) Field of Classification Search
CPC .... F16B 2/065; F16B 2/12; F16L 3/24; E04G 5/045
USPC ..................... 248/228.5, 228.3, 228.1, 228.2
See application file for complete search history.

(56) References Cited

U.S. PATENT DOCUMENTS

| | | | | |
|---|---|---|---|---|
| 252,679 | A * | 1/1882 | Knisely | E04B 9/24 52/350 |
| 631,887 | A * | 8/1899 | Clark | F16L 3/14 248/59 |
| 729,445 | A * | 5/1903 | Streeter | E04B 9/16 248/228.3 |
| 1,202,640 | A * | 10/1916 | Ahlander | F16L 3/24 24/135 R |
| 1,245,047 | A * | 10/1917 | Sherman | F16L 3/24 248/72 |
| 1,352,895 | A * | 9/1920 | Hoffman | F16L 3/24 248/72 |
| 1,473,504 | A * | 11/1923 | Neely | B60M 7/00 191/40 |
| 1,493,913 | A * | 5/1924 | Whiteside | A47D 13/105 248/228.5 |
| 1,658,956 | A * | 2/1928 | Wehr | B65G 9/008 104/111 |

(Continued)

OTHER PUBLICATIONS

Official Action for Canadian Patent Application No. 3013736, dated Jun 14, 2019, 4 pages.

*Primary Examiner* — Kimberly T Wood
(74) *Attorney, Agent, or Firm* — Sheridan Ross PC

(57) ABSTRACT

A clamping assembly for communication with beam members is provided. Clamping assemblies of the present disclosure are useful for attaching to various beams including, but not limited to, concrete I-beams. The clamping assemblies are useful for supporting a beam prior to complete installation of the beam in its intended location. Risk associated with beam movement, tipping and falling is mitigated by embodiments of the present disclosure.

18 Claims, 4 Drawing Sheets

(56) References Cited

U.S. PATENT DOCUMENTS

| | | | | |
|---|---|---|---|---|
| 1,730,793 | A * | 10/1929 | Stebler | B61H 13/36 |
| | | | | 188/210 |
| 1,974,628 | A * | 9/1934 | Presley | E01B 25/24 |
| | | | | 248/228.3 |
| 2,529,153 | A * | 11/1950 | Hain | H01R 4/64 |
| | | | | 238/14.14 |
| 2,877,974 | A * | 3/1959 | Estes | E04B 9/18 |
| | | | | 248/228.3 |
| 3,124,330 | A * | 3/1964 | Robinson | E04G 7/26 |
| | | | | 248/228.2 |
| 3,993,279 | A * | 11/1976 | Holt | E04G 17/18 |
| | | | | 248/235 |
| 5,595,363 | A * | 1/1997 | De Leebeeck | F16L 3/24 |
| | | | | 248/72 |
| 6,334,285 | B1 * | 1/2002 | Kirschner | E04B 9/18 |
| | | | | 248/228.1 |
| 6,520,705 | B2 * | 2/2003 | Stasney, Jr. | F16B 2/065 |
| | | | | 403/258 |
| 8,061,672 | B1 * | 11/2011 | Kaufman | E04B 2/82 |
| | | | | 248/228.3 |
| 8,240,632 | B2 | 8/2012 | Melic | |
| 8,480,041 | B2 * | 7/2013 | Myers | F16B 2/12 |
| | | | | 248/72 |
| 9,677,585 | B2 | 6/2017 | Broussard et al. | |
| 10,018,208 | B2 * | 7/2018 | Hollis | F16B 2/12 |
| 2006/0272889 | A1 * | 12/2006 | Paquette | A62B 1/04 |
| | | | | 182/3 |
| 2015/0284968 | A1 * | 10/2015 | Simmons | A62B 35/0081 |
| | | | | 182/36 |

\* cited by examiner

BRACING CLAMP FOR BEAMS

This U.S. Non-Provisional Patent Application claims the benefit of priority from U.S. Provisional Patent Application Ser. No. 62/543,183, filed Aug. 9, 2017, the entire disclosure of which is hereby incorporated by reference.

FIELD

The present disclosure relates generally to beam supports. More specifically, the present disclosure relates to systems, devices and methods for attaching bracing and supports to beam members. Certain embodiments of the present disclosure are useful in bridge construction applications, although no limitation with respect to beam-type or installation setting is contemplated or provided by this disclosure.

BACKGROUND

Beam members are useful in various construction applications including but not limited to bridge construction. Beams of various types and materials are useful in supporting various structures and withstanding various stresses at least when provided in an assembled or installed position. Prior to installation and securement of a beam, however, the beam may be unstable. For example, an unsecured beam may present a risk of falling or moving due to wind loads, accidental contact, or other forces that impact the beam before it is secured (e.g. before decking is poured to surround and secure the beam). Beams also must be properly secured during transit and while being positioned at a site.

Securement and stabilization of beams is complicated by the fact that many beams comprise structural members wherein drilling into or otherwise deforming the beam with a fastener or similar device is not permitted. For example, drilling into a concrete beam in order to secure the beam poses a significant risk of structurally damaging the beam and rendering it unfit for its intended purpose.

U.S. Pat. No. 8,240,632 to Melic, which is hereby incorporated by reference in its entirety, discloses a beam clamp assembly. Melic, however, fails to teach or disclose various novel features of embodiments of the present disclosure as shown and described herein.

U.S. Pat. No. 9,677,585 to Broussard et al., which is hereby incorporated by reference in its entirety, discloses a beam clamp assembly for clamping multiple beams together. Broussard et al., however, fail to teach or disclose various novel features of embodiments of the present disclosure as shown and described herein.

SUMMARY

Accordingly, there has been a long-felt but unmet need to provide a system, method and device for securing a beam without destroying or compromising beam integrity.

In various embodiments, the present disclosure provides a clamping system and method of use for attaching to and securing or stabilizing a beam in a temporary position. In such embodiments, a non-invasive and non-damaging beam clamp and method of use are provided to secure a beam without the need to provide fasteners or through-holes in a beam. Beams contemplated for use with embodiments of the present disclosure include but are not limited to steel, wood and concrete bridge beams.

In certain embodiments, a clamp is provided to non-invasively attach to a beam member and provide a brace point attachment operable to withstand wind loading and shear stress, for example. Clamps of the present disclosure provide support to a beam and prevent or minimize risk associated with a beam tipping and/or falling during construction operations and before the beam can be secured in place.

In one embodiment, a beam clamp assembly is provided that is selectively securable to a flange of a beam. The clamp assembly comprises a first clamping member and a second clamping member. Each of the clamping members comprises a base member, a second member extending at an angle to the base member, and a third member provided at an angle to the base member and the second member. The base member, the second member and the third member at least partially define an open area for receiving a flange of a beam. A plurality of plates is distributed along each of the clamping members and the plates are operable to be provided as contact points between the clamping members and a beam. An aperture is provided through each of the first clamping member and the second clamping member. A fastener extends through the aperture of the first clamping member and the aperture of the second clamping member, the aperture being operable to receive a tension force to draw the first clamping member toward the second clamping member.

The present disclosure contemplates beam clamps with first, second and third members as shown and described herein. Although such members are identified and referred to separately, various embodiments of the present disclosure contemplate that the clamp comprises a continuous object and the first, second and third members are co-formed and/or comprise different sections of a single piece of material. Accordingly, it will be recognized that the use of the terms "first member," "second member," and "third member" do not necessarily indicate that the members are separate objects.

In various embodiments, clamp members are provided that are operable for use with concrete beams including concrete I-beams. It will be expressly recognized, however, that devices and methods of the present disclosure are not limited to use with beams or any particular type of beam. In alternative embodiments and methods of use, it is contemplated that devices of the present disclosure are operable for use with steel beams (e.g. steel I-beams) and/or with beams of various sizes, shapes, orientations, etc.

In one embodiment, a beam clamp assembly is provided that is selectively securable to a flange of a beam. The beam clamp comprises a first clamping member and a second clamping member. Each of the clamping members comprises a base member, a second member extending at an angle to the base member, and a third member provided at an angle to the base member and the second member. The base member, the second member and the third member at least partially define an open area for receiving a flange of a beam. Each of the clamping members comprises a plate that is operable to be provided as a contact point between the clamping members and a beam. An aperture is provided through each of the first clamping member and the second clamping member, and a fastener extends through the aperture of the first clamping member and the aperture of the second clamping member, the fastener being operable to receive a tension force to draw the first clamping member toward the second clamping member.

In another embodiment, a beam clamp is provided that is selectively securable to a flange of a beam. The beam clamp comprises a base member, a second member extending at an angle to the base member, and a third member provided at an angle to the base member and the second member. The base member, the second member and the third member at least partially define an open area for receiving a flange of a beam. At least one plate is interconnected to an exterior surface of the clamp and is operable to be provided as a contact point between the clamping members and a beam, and an aperture is provided through the base member and operable to receive a fastener.

In one embodiment, a method of stabilizing a beam is provided that comprises providing a beam clamp assembly that is selectively securable to a flange of a beam. The clamp assembly comprises a first clamping member and a second clamping member. Each of the clamping members comprises a base member, a second member extending at an angle to the base member, and a third member provided at an angle to the base member and the second member. The base member, the second member and the third member at least partially define an open area for receiving a flange of a beam. An aperture is provided through each of the first clamping member and the second clamping member. A fastener extends through the aperture of the first clamping member and the aperture of the second clamping member, the aperture being operable to impart a tension force to draw the first clamping member toward the second clamping member. The first clamping member and the second clamping member are provided in opposing relationship on opposing sides of a flange of a beam. A tension force is applied to the fastener to compress the first and second clamping members to the beam.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
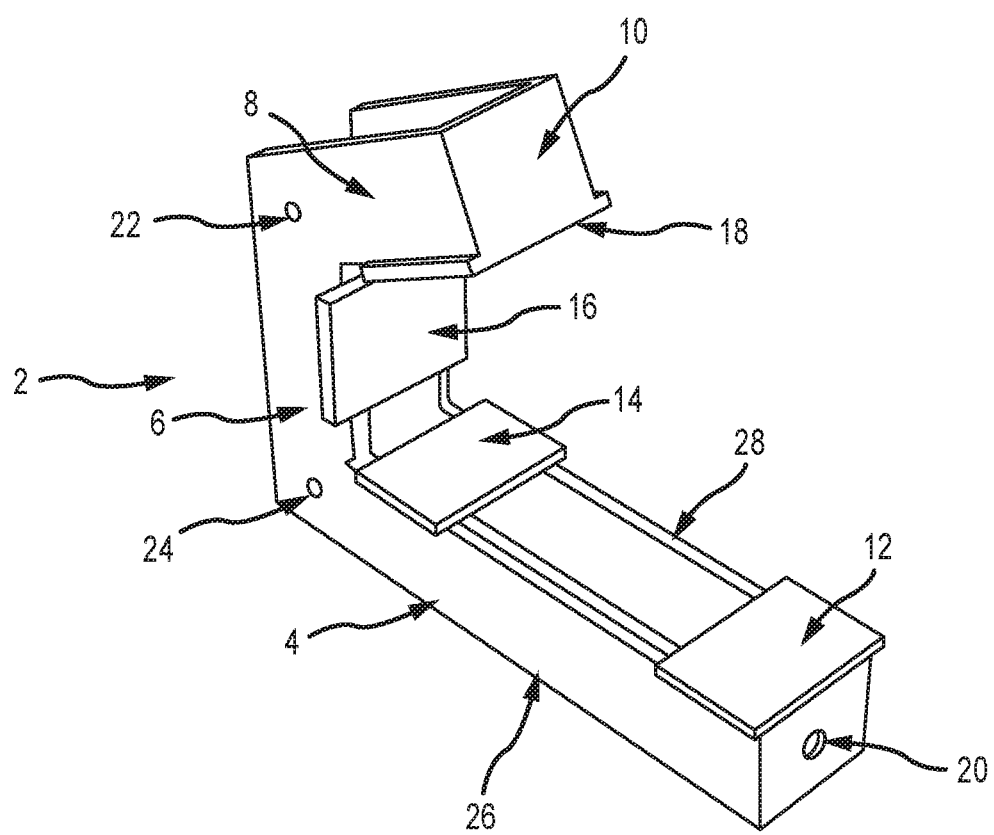
FIG. 1 is a perspective view of a beam clamp device according to one embodiment of the present disclosure.

FIG. 1 is a front perspective view of a clamping member 2 according to one embodiment of the present disclosure. As shown, the clamping member 2 comprises an open construction having a C-shape or partial C-shape. The clamp 2 comprises a first member 4, a second member 6 and a third member 8. In the depicted embodiment, the first member 4 generally comprises a horizontally-extending base member of the device. The second member 6 comprises a substantially vertically-extending member that is substantially perpendicular to the first member 4. The third member 8 comprises an angled member. Collectively, the first, second and third members 4, 6, 8 are operable to at least partially surround and receive a portion of a beam.

The open portion of the clamp 2 provided in FIG. 1 comprises a receiving portion for a beam. Specifically, the clamp 2 is operable to surround a flange of an I-beam or similarly shaped beam member. The clamp 2 comprises plates 12, 14, 16, 18. In various embodiments, the plates are provided as securing elements or weld-points to join and secure first and second planar portions 26, 28 of the clamp 2. It is further contemplated, however, that the plates 12, 14, 16, 18 comprise contact points for a beam member. The plates may therefore comprise a contact surface or material suitable for direct contact with the beam. The contact surface(s) are contemplated as being provided to increase friction between the clamp 2 and the beam and/or prevent damage to the beam. In some embodiments, at least one plate of the clamp 2 is provided as a metal plate with a rubber coating or layer and wherein the layer is provided as a contact point between a beam and the clamp. In certain embodiments, the plates are provided as metal plates to give structural stability to the clamping member 2.

As further shown in FIG. 1, the clamp 2 comprises a plurality of apertures. A first aperture 20 of the clamp 2 is provided to receive a threaded bolt or similar fastener and to secure the clamp to a second clamp (not shown in FIG. 1) and provide a clamping force on a beam as shown and described herein. Additional apertures 22, 24 are provided in the clamp 2 to provide for additional securement points and to serve as optional stabilization members. In some embodiments, a plurality of apertures or cut outs are provided in the clamp to reduce an overall weight of the clamp 2.

Figure 2B:
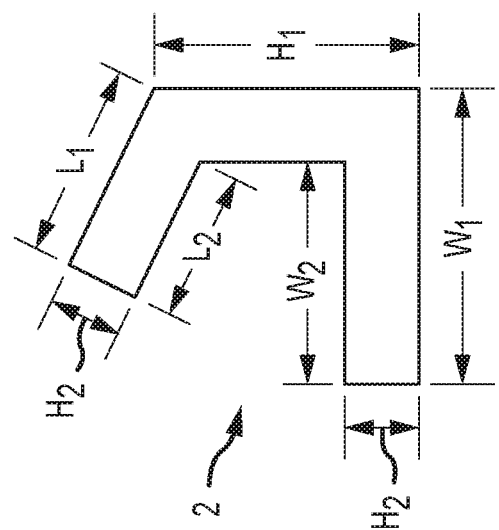
FIG. 2B is a side elevation view of a beam clamp device according to one embodiment of the present disclosure.
Figure 2A:
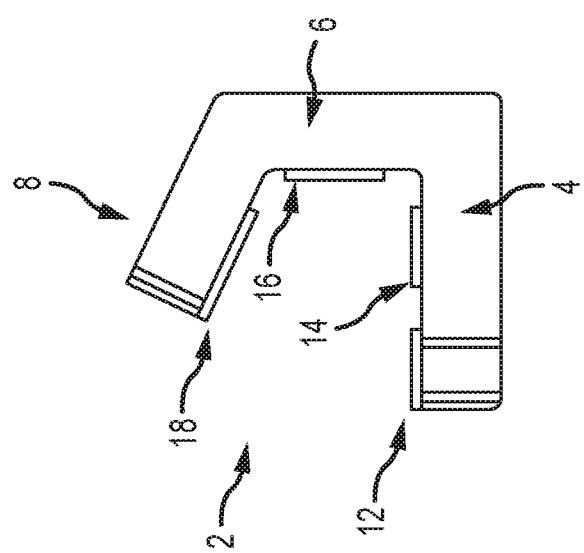
FIG. 2A is a side elevation view of a beam clamp device according to one embodiment of the present disclosure.

FIG. 2A is a side elevation view of a clamping member 2 according to one embodiment of the present disclosure. As shown, the clamping member 2 comprises a base member 4, a second member 6 and a third member 8. A plurality of plates 12, 14, 16, 18 are provided. As shown in FIG. 2A, two plates 12, 14 are provided on the base member 4. A plate 16 is provided on the second member 6 and a plate 18 is provided on the third member 8. In other embodiments, however, it is contemplated that the number and placement of plates may be varied. For example, a single plate may be provided on each of the members 4, 6, 8. In another embodiment, one or more plates are provided on only one of the members 4, 6, 8.

FIG. 2B is a dimensional side elevation view of a clamping member 2 according to one embodiment of the present disclosure. The dimensioned view of FIG. 2B is provided to illustrate one contemplated clamping member 2, and no limitation with respect to dimensions or proportions of the clamping members are provided herewith. As shown in FIG.

2B, the clamping member 2 comprises a first height $H_1$ that is preferably between approximately 10.00 and 20.00 inches, and more preferably of between approximately 12.0 and 16.0 inches. In some embodiments, the first height $H_1$ comprises a height of approximately 14.257 inches. As shown in FIG. 2B, the clamping member 2 comprises a first width $W_1$ that is preferably between approximately 10.00 and 20.00 inches, and more preferably of between approximately 12.0 and 16.0 inches. In some embodiments, the first width $W_1$ comprises a width of approximately 15.960 inches. As shown in FIG. 2B, the clamping member 2 comprises a second width $W_2$ that is preferably between approximately 10.00 and 15.00 inches, and more preferably of between approximately 11.0 and 13.0 inches. In some embodiments, the second width $W_2$ comprises a width of approximately 12.00 inches. As shown in FIG. 2B, the clamping member 2 comprises a second height $H_2$ that is preferably between approximately 2.00 and 5.00 inches, and more preferably of between approximately 3.0 and 4.0 inches. In some embodiments, the second height $H_2$ comprises a height of approximately 3.960 inches. As shown in FIG. 2B, the clamping member 2 comprises a first length $L_1$ that is preferably between approximately 8.00 and 15.00 inches, and more preferably of between approximately 10.0 and 11.0 inches. In some embodiments, the first length $L_1$ comprises a length of approximately 10.610 inches. As shown in FIG. 2B, the clamping member 2 comprises a second length $L_2$ that is preferably between approximately 6.00 and 12.00 inches, and more preferably of between approximately 7.0 and 9.0 inches. In some embodiments, the second length $L_2$ comprises a length of approximately 8.127 inches.

Figure 3:
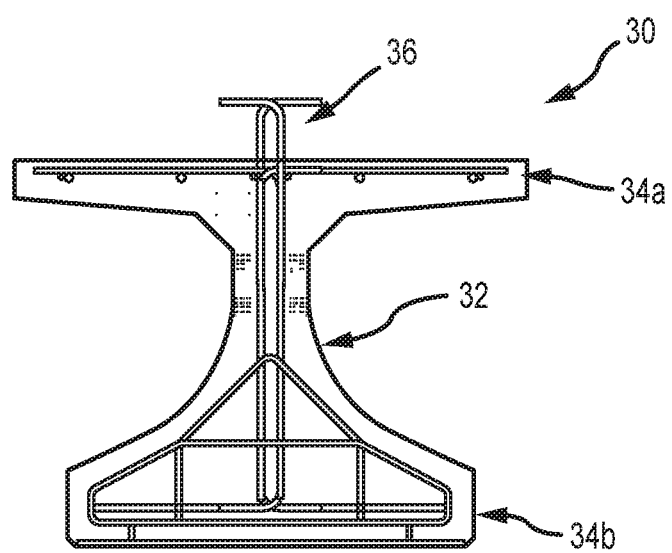
FIG. 3 is a cross-sectional elevation view of a beam contemplated for use with clamp devices of the present disclosure.

FIG. 3 is a cross-sectional elevation view of a beam 30 contemplated for use with clamping members of the present disclosure. The beam 30 of FIG. 3 is provided to illustrate one type of beam that may be used with devices and methods of the present disclosure. Various other beams are also contemplated for use with clamping members of the present disclosure. The beam 30 of FIG. 3 comprises a concrete beam with a web 32, a first flange 34a and a second flange 34b. The beam 30 further comprises an embedded tie or anchor member 36.

Figure 4:
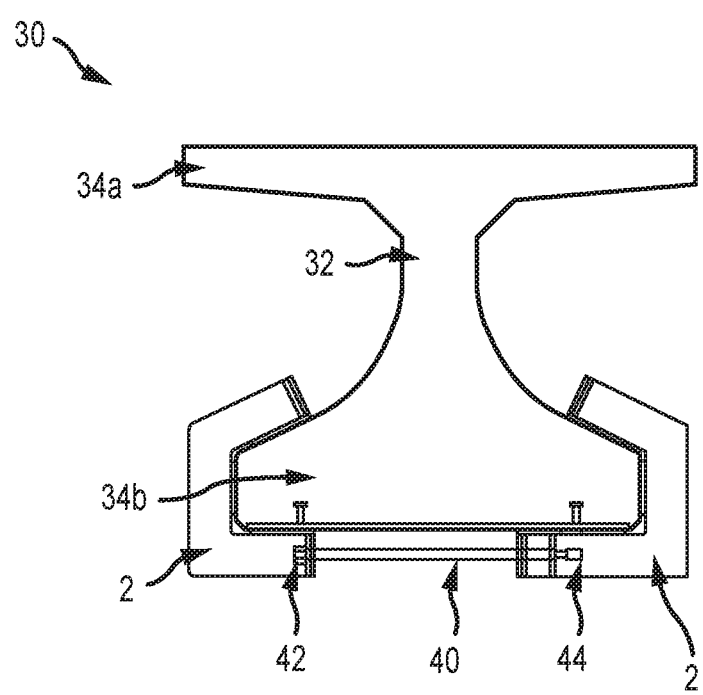
FIG. 4 is a side elevation view of beam provided with a clamp system according to one embodiment of the present disclosure.

FIG. 4 is a side elevation view of a pair of clamping members 2 provided in communication with a beam 30. A pair of clamping members 2 are provided in opposing relationship and wherein the open area of the clamping members receives a flange 34b of the beam 30. The clamping members 2 are preferably sized to matingly receive the size and shape of the flange 34b. It is an aspect of the present disclosure to provide various different clamping members of various different sizes and shapes so as to accommodate the dimensions and features of various beams.

As shown in FIG. 4, the clamping members 2 are connected by a fastener 40. In some embodiments, it is contemplated that the fastener 40 comprises a threaded rod or other similar connection mechanism that extends through apertures provided in both of the clamping members 2 and wherein the threaded rod (or partially threaded rod) is operable to receive a tension force and urge the clamping members toward each other and provide a compressive clamping force on the beam 30. A hex-head 42 is provided at one end of the fastener 40. A second end 44 of the fastener 40 extends into a second clamping member and is provided in force-transmitting communication therewith. In some embodiments, the second end of the fastener 40 comprises a threaded end that engages a threaded female aperture in the clamping member 2 and/or is provided with a nut (not shown in FIG. 4) that is in communication with an interior portion of the clamping member 2. As shown in FIG. 1, the clamping members comprise an at least partially open or hollow interior that allows access to the hex-head of the first end 42 of the fastener and the second end 44 of the fastener 40. Accordingly, once the first and second clamping members 2 are provided in an appropriate position, the clamping members may be tightened and provided with a clamping force by applying a tension to the fastener 40.

In the assembled state shown in FIG. 4, the clamping assembly provides a stabilization structure to the beam 30. Specifically, the clamping assembly comprising first and second clamps 2 provide for a larger base than if the beam 30 were stood on the bottom flange 34b alone. Additionally, the clamps 2 provide for a point of attachment and securement of various additional objects. As noted, it is often undesirable or prohibited to drill or otherwise penetrate into the beam 30. The clamps 2 provide for a non-invasive attachment to the beam 30 and wherein additional elements, fasteners, attachments, etc. may be connected to one or both of the clamps 2. Additionally, although only one end of the beam 30 is shown in FIG. 4, it is contemplated that clamps 2 may be provided at various points along a length of the beam 30 depending on the length of the beam and various considerations specific to the construction site. The clamp assembly further comprises an object that may remain on the beam even after final setting of the beam and concrete pouring (should the particular application require it). Devices of the present disclosure may therefore comprise single-use items that are cast-in-place and not reused. Alternatively, the clamp assemblies may be removed from the beam prior to final installation and setting of the beam.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A beam clamp assembly that is selectively securable to a flange of a beam, comprising:
   a first clamping member comprising first and second planar portions, the first and second planar portions being spaced apart and parallel;
   a second clamping member comprising first and second planar portions, the first and second planar portions being spaced apart and parallel;
   a plurality of plates securing the first and second planar portions of the first clamping member and the second clamping member, and wherein the plates extend between and contact both of the first planar portion and the second planar portion;
   wherein the plates are further operable to provide one or more contact points for an object to which at least one of the first and second clamping members are secured;
   each of the clamping members comprising a base member, a second member extending at an angle to the base member, and a third member provided at an angle to the base member and the second member;
   wherein the plurality of plates comprises three plates, and wherein a first plate is secured to the base member, a second plate is secured to the second member, and a third plate is secured to the third member;
   the base member, the second member and the third member at least partially defining an open area;
   an aperture provided through each of the first clamping member and the second clamping member; and
   a fastener extending through the aperture of the first clamping member and the aperture of the second clamping member, the fastener being operable to receive a tension force to draw the first clamping member toward the second clamping member.

2. The beam clamp assembly of claim 1, wherein the fastener comprises a threaded rod and a nut.

3. The beam clamp assembly of claim 1, wherein the second member is provided substantially perpendicular to the base member.

4. The beam clamp assembly of claim 1, wherein the aperture provided through the first clamping member is provided in the base member.

5. The beam clamp assembly of claim 1, wherein the aperture provided through the second clamping member is provided in the base member.

6. A beam clamp comprising:
   a base member, a second member extending at an angle to the base member, and a third member provided at an angle to the base member and the second member;
   wherein the base member comprises a planar lower surface with a first width, an upper surface operable to be provided in contact with a beam and having a second width, and wherein the first width is greater than the second width;
   wherein the beam clamp comprises an overall width that extends outwardly from the upper surface of the surface of the base member by at least about 2.0 inches, and wherein the beam clamp is operable to support a beam and prevent tipping or falling of the beam at least prior to installation of the beam;
   the base member, the second member and the third member at least partially defining an open area;
   at least one plate interconnected to each of the base member, the second member and the third member, and wherein the plates are operable to provide structural support to the beam clamp and provide at least one contact point for an object to be provided in contact with the beam clamp;
   wherein the at least one plate is welded to at least one of the base member, the second member and the third member; and
   an aperture provided through the base member and operable to receive a fastener.

7. The beam clamp of claim 6, further comprising a fastener extending through the aperture, the fastener being operable to impart a tension force on the beam clamp base member.

8. The beam clamp of claim 7, wherein the fastener comprises a threaded rod and a nut.

9. The beam clamp of claim 6, wherein the second member is provided substantially perpendicular to the base member.

10. The beam clamp of claim 6, wherein the at least one plate is welded to each of the base member, the second member and the third member.

11. The beam clamp of claim 6, wherein the plate further comprises a protective coating.

12. The beam clamp of claim 6, wherein the clamp is comprised of steel.

13. A method of stabilizing a beam comprising:
   providing a beam clamp assembly that is selectively securable to a flange of a beam, the beam clamp assembly comprising:
   a first clamping member and a second clamping member;
   each of the clamping members comprising first and second planar portions, the first and second planar portions being spaced apart and parallel;
   a plurality of plates welded to each of the clamping members and wherein at least some of the plurality of plates span a distance between the first and second planar portion;
   each of the clamping members comprising a base member, a second member extending at an angle to the base member, and a third member provided at an angle to the base member and the second member;
   the base member, the second member and the third member at least partially defining an open area for receiving a flange of the beam;
   an aperture provided through each of the first clamping member and the second clamping member; and
   a fastener extending through the aperture of the first clamping member and the aperture of the second clamping member, the aperture being operable to impart a tension force to draw the first clamping member toward the second clamping member;

providing the first clamping member and the second clamping member in opposing relationship on opposing sides of a flange of the beam, and wherein the first clamping member and the second clamping member each extend outwardly beyond a width of the beam by at least about 2.0 inches;

applying a tension force to the fastener to compress the first and second clamping members to the beam.

14. The method of claim 13, wherein the fastener comprises a threaded rod and a nut.

15. The method of claim 13, wherein the second member is provided substantially perpendicular to the base member.

16. The method of claim 13, wherein the aperture provided through the first clamping member is provided in the base member.

17. The method of claim 13, wherein the aperture provided through the second clamping member is provided in the base member.

18. The method of claim 13, wherein each of the clamping members comprise a width that extends outboard of the beam by at least about 3.5 inches.

\* \* \* \* \*